(12) United States Patent
Avila

(10) Patent No.: US 11,528,852 B2
(45) Date of Patent: Dec. 20, 2022

(54) GREENHOUSE SIDEWALL VENTILATION SYSTEM

(71) Applicant: David Avila, Brigham City, UT (US)

(72) Inventor: David Avila, Brigham City, UT (US)

( * ) Notice: Subject to any disclaimer, the term of this patent is extended or adjusted under 35 U.S.C. 154(b) by 0 days.

(21) Appl. No.: 17/209,840

(22) Filed: Mar. 23, 2021

(65) Prior Publication Data

US 2022/0039333 A1 Feb. 10, 2022

Related U.S. Application Data

(63) Continuation-in-part of application No. 16/984,629, filed on Aug. 4, 2020.

(51) Int. Cl.
*A01G 9/24* (2006.01)

(52) U.S. Cl.
CPC .............. *A01G 9/246* (2013.01); *A01G 9/247* (2013.01)

(58) Field of Classification Search
CPC ........... A01G 9/246; A01G 9/247; A01G 9/14
USPC .............................................................. 47/17
See application file for complete search history.

(56) References Cited

U.S. PATENT DOCUMENTS

| | | | | |
|---|---|---|---|---|
| 3,078,780 A * | 2/1963 | Bottlander | ............. | A01G 9/246 47/17 |
| 3,124,903 A * | 3/1964 | Truhan | ................... | A01G 9/246 47/17 |
| 3,824,736 A * | 7/1974 | Davis | ..................... | A01G 7/045 47/17 |
| 4,795,415 A | 1/1989 | Francis | | |
| 6,076,313 A * | 6/2000 | Pannell | .................. | A01G 9/246 52/302.3 |
| 9,161,498 B1 | 10/2015 | Shelor | | |
| 9,907,236 B2 | 3/2018 | Kamp | | |
| 10,219,447 B1 * | 3/2019 | DeCarli | ............... | B65D 88/005 |

(Continued)

FOREIGN PATENT DOCUMENTS

WO 2007105168 A2 9/2007
WO 2018058820 A1 4/2018

OTHER PUBLICATIONS

Wikipedia Cannabis, last edited on Mar. 8, 2021.
(Continued)

*Primary Examiner* — Yvonne R Abbott-Lewis
(74) *Attorney, Agent, or Firm* — Stonebridge IP, PLLC

(57) ABSTRACT

This disclosure describes a positive pressure greenhouse including one or more plants disposed on a plant table surface, wherein the plant table surface is disposed above ground level and has an area below the plant table surface and above the ground, one or more upper wall tubes including one or more upper wall tube fans disposed above the plant table surface, one or more lower sidewall tubes comprising one or more lower side wall tube fans disposed below the plant table surface which may be at or near ground level. The one or more lower sidewall tube fans may be configured to draw air from the area below the plant table surface, wherein air is further drawn down from above the plant surface table, e.g., the area of the upper wall tubes and upper wall tube fans, to ground level of the greenhouse. The one or more lower wall tube fans may also be configured to blow air into the area below the plant table surface wherein the blown air further rises above the plants and into the area of the upper wall tubes and upper wall tube fans.

12 Claims, 7 Drawing Sheets

(56) References Cited

U.S. PATENT DOCUMENTS

| | | |
|---|---|---|
| 2003/0070353 A1 | 4/2003 | Mercurio et al. |
| 2008/0000151 A1 | 1/2008 | Houweling et al. |
| 2008/0142197 A1* | 6/2008 | Van Andel ............... F28F 1/122 |
| | | 165/122 |
| 2010/0126062 A1 | 5/2010 | Houweling et al. |
| 2010/0257878 A1* | 10/2010 | Arbel ................... F24F 11/0008 |
| | | 165/59 |
| 2012/0000121 A1 | 1/2012 | Swann |
| 2013/0122800 A1* | 5/2013 | Lee ........................ A01G 9/246 |
| | | 454/258 |
| 2015/0173308 A1* | 6/2015 | Lefsrud ................... A01G 9/14 |
| | | 47/17 |
| 2016/0157440 A1 | 6/2016 | Looije et al. |
| 2018/0160632 A1* | 6/2018 | Voermans ............... A01G 9/247 |
| 2018/0263195 A1 | 9/2018 | Hutto |
| 2018/0271031 A1 | 9/2018 | Houweling |

OTHER PUBLICATIONS

PCT International Search Report, international appl. No. PCT/US2021/044525, dated Nov. 10, 2021.

PCT Written Opinion of the International Searching Authority, international appl. No. PCT/US2021/044525, dated Nov. 10, 2021.

* cited by examiner

GREENHOUSE SIDEWALL VENTILATION SYSTEM

CROSS REFERENCE TO RELATED APPLICATIONS

This application is a continuation in part of U.S. Ser. No. 16/984,629 filed on Aug. 4, 2020, the entire contents of which is hereby incorporated by reference in its entirety.

BACKGROUND OF THE DISCLOSURE

Field of the Invention

This application is directed to greenhouse structures, including greenhouse structures with managed airflow.

Description of the Related Art

There are often problems with tunnel ventilated and cross flow ventilated buildings for example greenhouse structures. Both create negative pressure using fans at one wall pulling air out of the building and having cool pads with water flow at the opposing wall allowing outside air into the building and cooling it via evaporation of water at the cool pad. One must condition all the air volume of these types of cooling buildings. Air also takes the least path of resistance so air quality in the building may be spotty due to high air flow in some areas and low air flow in others. When a door is opened, air rushes into the vacuum and the conditioning of the building may stop functioning.

A positive pressure building forces air into the building at strategic points and with the use of interior circulating fans and maintains proper air flow at the lower strata. The ridge of the building is open so cooled air comes in at the lower strata of the building perimeter, and hot air naturally rises out the ridge.

A typical greenhouse is tunnel ventilated. Meaning the building normally has fans lined up at one end wall pulling air out of the building creating a negative pressure environment. To cool the building, there are typically cool cell pads on the opposite end of the building. A cool cell pad has water trickling from top to bottom and is permeable to allow outside air to flow into the building through the pad which cools the air via evaporation (evaporative cooling).

One problem is that a negative pressure building can pull unwanted insects into the building which are predaceous to plants. Another problem is that it can also pull pollen from other plants that are in the same species causing plants to go from flower to seed. The flower is typically the product of value not the seed. Another problem is that when a door is opened into a negative pressure building outside air is sucked into the building which negatively impacts the interior air quality.

As mentioned, to cool air via evaporation, pulling air through a cooling pad is the typical method. There is no control as to how much water is taken up (absorbed) into the air flow in the form of vapor as the air moves through the cooling pads. The challenge is to provide in the summer, cooled air to the plants but at the same time knowing the amount of vapor the air has absorbed after passing through the cool pads and loading up with water vapor.

The same volume of air flow must still have enough absorption capacity to absorb the evapotranspiration, i.e., water vapor deriving from the plant photosynthesis process as the air passes over the plants and exits the building through the fans pulling air out of the building. If the air is oversaturated from the cooling pads, it cannot absorb sufficient amounts of vapor from the plants and other interior sources of moisture from daily operations, causing a spike in humidity inside the building. Too high a humidity will encourage the growth of mold and fungus on the plants and flowers which deteriorates the quality of the plants.

For greenhouse designs, plants may be grown directly on the ground or floor of the structure, for example, in bags placed at ground level or on the floor. In some cases, for example, the bags may be 60-pound bags placed directly on the floor. In a greenhouse in which airflow is managed vertically, that is, airflow proceeds up and down in a vertical direction to ground, this design may provide for even air flow about the plants allowing for proper air quality to and about the plants.

In designs, however, where the method of plant growing is on tables or other similar structures rather than bags laid out on an open floor, the tables being side to side may cover a significant percentage of the floor area. For example, 94% of the floor area may be covered. Each table may be moved or rolled to create a walkway for plant maintenance along with a wide center walkway. This arrangement, however, creates a dead air chamber under the tables. Such a chamber may not be effectively managed from vertically disposed fan air tubes which deliver air from above the plants and circulate the air in a stratified or vertical manner.

As to a tunnel ventilated style building, positive air flow may be lateral and not vertical. One challenge with lateral type air flow in a greenhouse is that the lateral moving air accumulates water vapor which then creates an environment for mildew, not to mention the lack of carbon dioxide to the plants downstream.

Accordingly, there is a need for tunnel ventilated style greenhouse structures with lateral air flow which are capable of managing dead air regions, for example under tables and other structures in the building, and that also effectively manage air quality for optimum plant growth and quality.

SUMMARY OF THE INVENTION

This disclosure describes a positive pressure greenhouse including one or more plants disposed on a plant table surface, wherein the plant table surface is disposed above ground level and has an area below the plant table surface and above the ground, one or more upper wall tubes including one or more upper wall tube fans disposed above the plant table surface, one or more lower sidewall tubes comprising one or more lower side wall tube fans disposed below the plant table surface which may be at or near ground level.

The one or more lower sidewall tube fans may be configured to draw air from the area below the plant table surface, wherein air is further drawn down from above the plant surface table, e.g., the area of the upper wall tubes and upper wall tube fans, to ground level of the greenhouse. The one or more lower wall tube fans may also be configured to blow air into the area below the plant table surface wherein the blown air further rises above the plants and into the area of the upper wall tubes and upper wall tube fans.

The present disclosure uses natural stratification of air to reduce the amount of air in the building to manage and a conditioning chamber to precondition the air prior to that air having contact with the plants. Good air quality at each plant enhances growth and quality of product from each plant. The disclosure further provides a light deprivation chamber with a centerline vent and operable louvers to recycle warm air and to be able to reduce the area of the building to heat by closing the light deprivation cover to create a smaller chamber (volume of air) to heat and recycle to conserve heat and take advantage of heat from grow lights.

The present disclosure further provides being able to cycle warm air from an upper air sink chamber back into an air intake/conditioning chamber to conserve energy and using air tube fans to deliver quality conditioned air from a conditioning chamber to all the plants. A system to oscillate the interior circulating fans using one drive and a cable linking system is also provided.

For tunnel ventilated structures with lateral air flow, side wall air tunnels may be designed to manage air flow at the plant canopy with different air qualities in winter verses summer using the same equipment by reversing the air flow. The air flow is designed to use the natural characteristics of the atmosphere base on barometric pressure in combination with the psychrometrics of air. Conventional structures simply use the force of air from fans in an attempt to manage air quality within a building.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
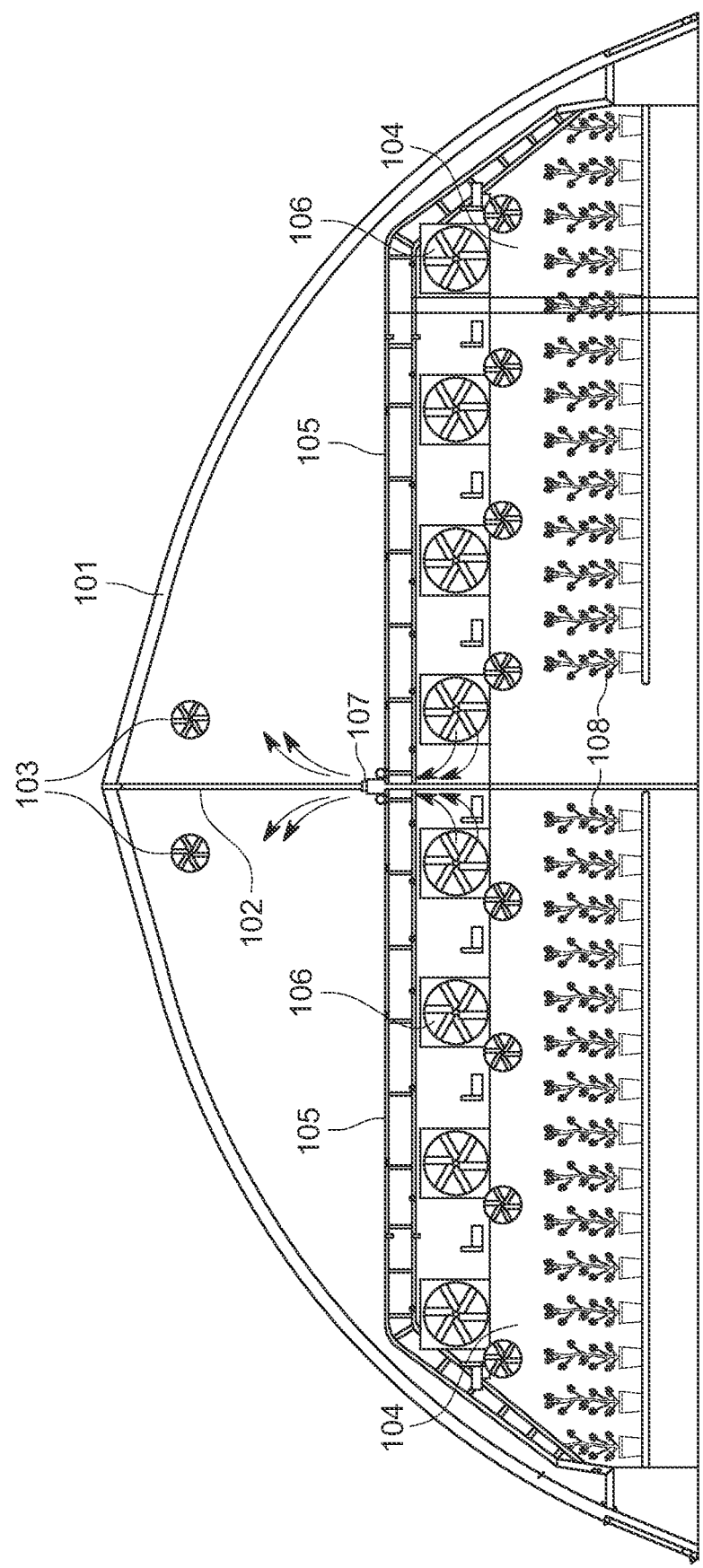
FIG. 1 shows an embodiment of a greenhouse of the disclosure.

The following detailed description is provided to assist the reader in gaining a comprehensive understanding of the methods, products, and/or systems, described herein. However, various changes, modifications, and equivalents of the methods, products, and/or systems described herein will be apparent to an ordinary skilled artisan.

The present disclosure provides a greenhouse configured to force air into the building using fans (blowing air into the building) causing it to have positive pressure. This pressure blows air out any holes which insects may use to enter the building. The incoming air may also be filtered using an insect screen with openings too small for thrips (very small insects). If pollen is a problem, a specialized filter is installed to collect any pollen from the incoming air flow. Air access chambers are used to enter the building. An air access chamber has an exterior door and an interior door. Open the exterior door, enter the chamber, close the exterior door, open the interior door and walk/drive in.

Using a psychrometric chart to determine the absorption capacity of outside air being forced into a building via intake fans can allow one to calculate at what humidity the air to be delivered to the plants must be to still have capacity to remove excessive vapor from the plants as that air leaves the building. In addition, the total vapor load inside the building must be calculated from the plants at the grow area to determine the quantity of air to push over the plants that will equal the amount of excessive vapor to remove. Knowing the vapor capacity of the incoming air and vapor load from the grow area, it can be determined what needs to be done to the incoming air to provide an optimal condition of air to the plants.

For example, water misting heads, can be used with a known quantity of water to inject a calculated amount of vapor into incoming air while leaving capacity in the air to absorb the evapotranspiration (vapor load) from the grow area to maintain a controlled amount of humidity (vapor) in the air around the plants to prevent the growth of mold and fungus on the plants. Accordingly, a specialized air intake/mix chamber is provided where incoming air is conditioned both in winter and summer prior to being forced into the grow chambers to provide quality air with proper humidity and temperature to all plants.

The present disclosure provides using the physiology (psychrometrics) of air to manage the quality of the air at the plants' level (e.g., floor to about 14 feet) for maximum growth. Air changes in volume and weight under different, predictable, conditions of heat (BTUs) and vapor (water) it contains. This is then used to calculate the air flow required to maintain air quality at the plants.

A weather station outside the building is used to measure heat and humidity at the outside air as a baseline condition of the air. A computer program may be used to operate the building's functions. That is, the computer can calculate the energy of the incoming air (e.g., BTUs and % vapor); calculate the interior air conditions via information collected from sensors inside the grow areas (e.g., floor to about 14' above the floor) and at the upper air chamber (e.g., above 14') to operate fans, louvres, misters, in concert to alter and manage air quality at the plant grow area. In embodiments, the building may be about 25' tall.

In one example, in summer conditions, the air will be hot and have a certain percent humidity. First, the proper amount of mist must be added to the incoming air to cool it but not so much as to cause the air to not to be able to collect the heat and vapor loads generated at the grow chambers. Adding mist to the air cools the air down, causing one pound of air to displace a smaller area. That is, one pound of hot air occupies a greater volume than one pound of cooler air which causes the hot air to rise above cooler heavier air. The cooler heavier air that has been formulated at an air intake/conditioning chamber is delivered to the plants via fan tubes evenly over the entire grow chamber areas directly to the plants.

The fresh conditioned air is blown into the grow chambers and is heavier, as previously explained, than the air that has been in the grow areas absorbing heat from the sun and moisture from the plants and other interior sources that causes the loaded air to rise up into the upper chamber (14' and above) and out of contact with the plants. The loaded air at the upper chamber will then be pushed out of the building via operable louvres at the end wall. Note, the upper air chamber has no plants, thus, the air quality at the upper chamber is managed to prevent condensation only. Too much heat and or vapor for the plants is not a consideration for the upper chamber. Thus, the upper air chamber is a cushion to air quality for it can absorb plant gases, heat, and vapor without concern for plant quality.

Therefore, the air volume of the building that needs to be conditioned is the approximately floor to 14' area, i.e., a grow chamber. This is in contrast to a tunnel ventilated type building, described below, that has to condition the whole volume of air inside the building because there is no stratification of the building's interior air. Consequently, the condition of the full air volume of the building must be controlled. This increases air turnover which requires more energy for fan power to move a larger volume verses conditioning only the critical area at the plants.

Fan tubes are a round, clear plastic tube with small air discharge holes (e.g., about 2" to 3" in diameter) spaced at the bottom of the tube connected to a fan at one end which force air through the tubes for the full length of the building. The fans may be installed at a common wall between the air intake/conditioning chamber and the plant grow chamber and pull conditioned air out of the chambers and deliver conditioned air evenly to each plant throughout the total grow areas via holes along the bottom of the tubes.

These holes are designed to evenly discharge an equal amount of air from each hole which in turn delivers the same quality of air to each plant throughout the whole of the building. This is contrary to a tunnel ventilated type building which moves the air from one end to the other. Using stratification of the air to manage the building's interior air, energy savings can also be achieved.

In another example, during winter the outside air is cold and will have a lower percent humidity. A heating chamber can be placed in front of the fan air tubes. The cold exterior air and intake chamber passes through the heaters before being pulled by tube fans and distributed into the grow chamber evenly over the plants. As described above, this air that has been heated is lighter than the cold air at the grow chamber. This presents a problem since hot air tends to rise over the existing colder air at the plants. To address this, the grow chambers may be fitted with circulation fans which are directed down to force the warm air from the air tubes down and around the plants heating them and absorbing moisture preventing the growth of molds and fungus. Nevertheless, the warmer air will rise up into the upper air chamber. The building can thus also conserve heat by recycling the warm air back through the air intake/conditioning chamber. In a tunnel ventilation building warm air is wasted by exhausting out the end of the building or wasted at a ridge vented building because the warm air naturally rises out of the building via ridge vents.

The present invention uses an upper chamber as a heat sink. The system can recycle the upper chamber's warm air back into the intake/conditioning chamber tempering the colder intake air, and routing that air as normal through the heaters and through the fan tubes back to the plants and rising again up to the upper chamber. This can be accomplished using louvres at an upper portion of a common wall between the air intake/conditioning chamber and the grow/upper air chambers. If the air that has cycled from the plants up into the upper air chamber, which will be warmer than the incoming outside air, does not contain too much vapor, the air can be recycled by closing the louvres located at the end wall of the building and opening the louvres at an upper air chamber wall to recycle the heated air. If the air at the upper chamber is too wet and cannot absorb further moisture at the plants, exhaust end wall louvres can be opened and the air chamber wall louvres closed, which forces the wet air out the exhaust end of the building.

The grow chambers also have interior frames that may be, for example, at approximately 18 feet on center and approximately 14 feet high to support a light deprivation cover. To cause plants to flower 12 hours of light and 12 hours of dark is typically needed. Consequently, the plants can be mechanically covered to block sunlight. The cover over the trusses can create an interior chamber. That is, a separation between the grow chambers and the upper air chamber. The fan tubes may be below the deprivation cover at the grow chambers to maintain the quality of the interior air using the same heat/cool air delivery. A problem is relieving the air from the enclosed grow chamber. Exhausting air evenly from a grow room chamber is a problem for which state-of-the-art greenhouse designs have no solution.

To address this challenge, the present disclosure provides a centerline exhaust vent. This vent is at the center of the grow room chamber and is a continuous front (fan tube end) to the opposite end of a grow chamber. The total cross section area of this vent is designed to handle incoming air flow from all the fan tube fans.

This then allows the conservation of heat in the winter. Louvres can be installed at the lower portion of the common wall between the intake/conditioning air chamber and the grow chambers. If the grow chamber air is not too wet, the center line vent can be closed, and the lower louvres can be opened causing warm air to go back into the heat chamber below the heaters. Consequently, the air can then blend with the cold incoming outside air and be heated to the desired temperature and forced via the fan tubes back over the plants saving heat.

This feature has extra value in the winter for when the days are short and cold, the dep chamber cover can be closed at dark and taking advantage of the heat from the numerous numbers of grow lights required to extend the short daylight hours to 12 hours. By managing the grow chamber louvres and the centerline vent, one can take advantage of the light heat resulting in less natural gas burning with the heaters. Ultimately this saves energy and money. State-of-the-art greenhouses currently cause great variation in air quality around the plants.

The polyethylene roofing material may be of two types. One at the air intake chamber which lets in less light but with a 20-year life versus a 5-year life material over the plants which allows much more natural light at the plants.

The present disclosure also provides a greenhouse building that can be modified for each area that it is to be built. The building may be constructed so that each component can be sized to perform more or less work depending on the site-specific needs. The buildings can also be configured in various widths and lengths as necessary to address local conditions in a particular greenhouse environment.

FIG. 1 shows greenhouse 101, upper air sink (from intake) chamber 102 comprising circulation fans 103, grow chambers 104 and frames or trusses 105, fans and fan tubes 106 disposed between the upper air intake chamber 102 and grow chambers 104, and centerline vent 107. FIG. 1 further shows plants 108 in the grow chambers 104.

Figure 2:
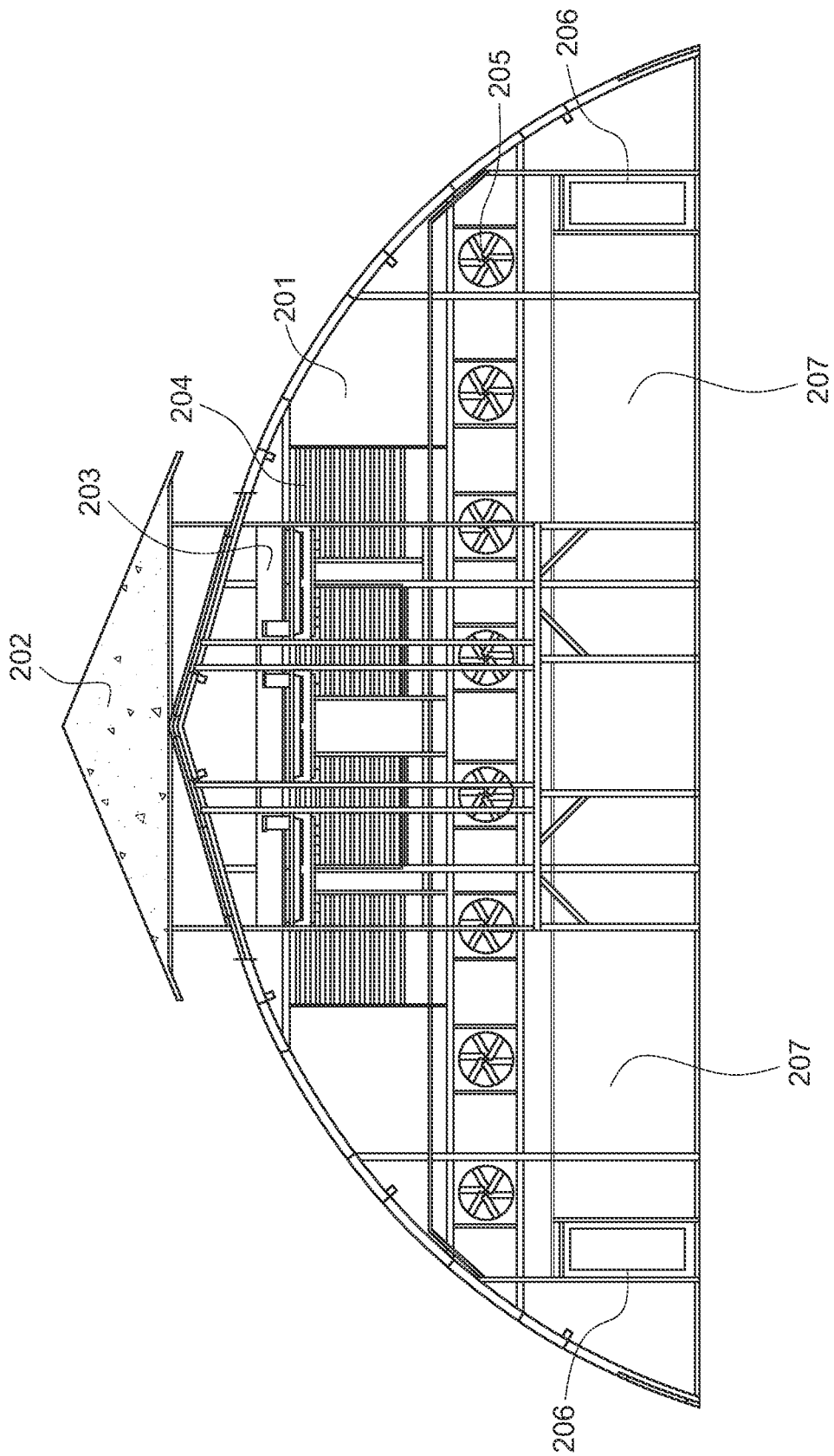
FIG. 2 shows another embodiment of a greenhouse of the disclosure.

FIG. 2 shows another embodiment of greenhouse 201, air intake chamber roof structure 202, air intake fans 203, louvres 204, fans and fan tubes 205, doors 206 and heat/mist chambers 207.

Figure 3:
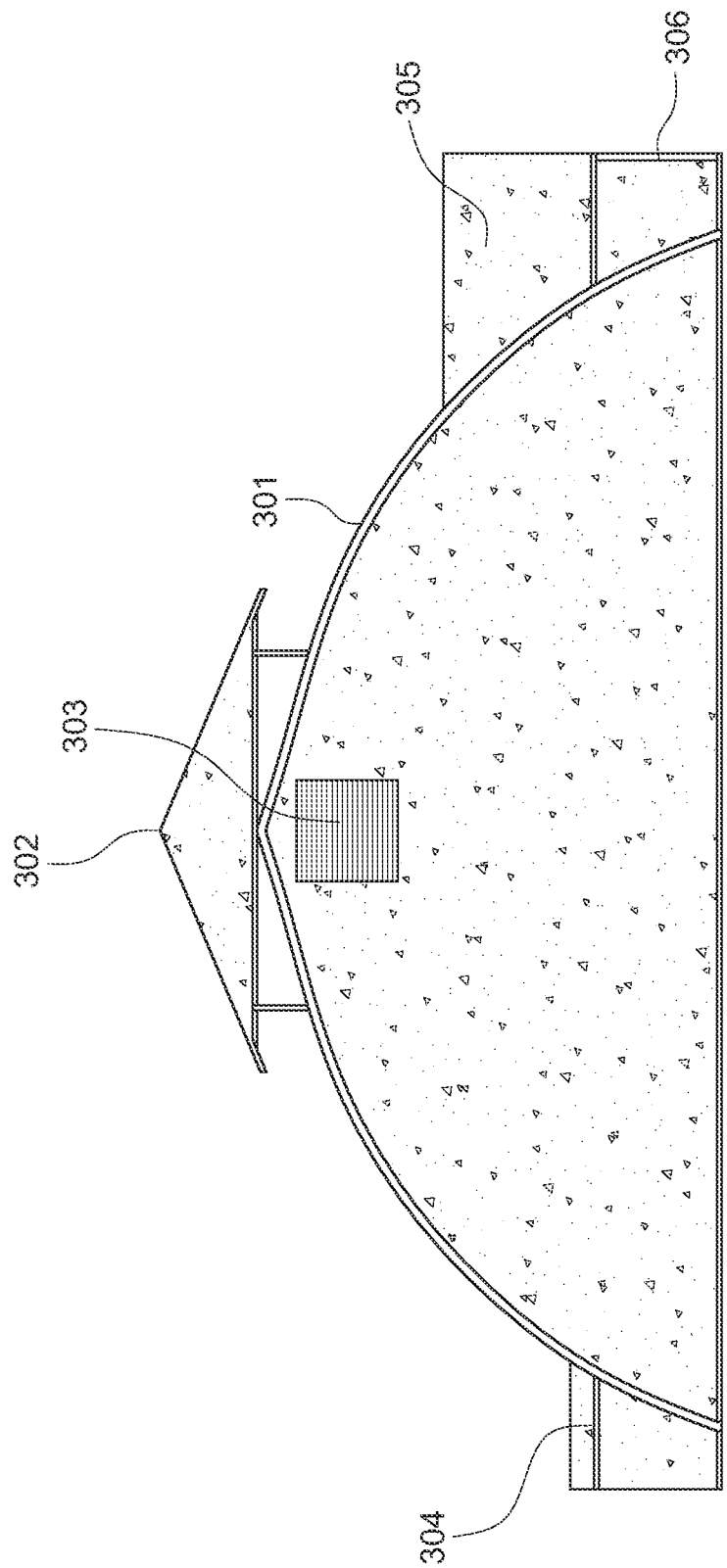
FIG. 3 shows another embodiment of a greenhouse of the disclosure.

FIG. 3 shows another embodiment of greenhouse 301, air intake chamber roof structure 302, louvre 303, access chamber 304 and access chamber 305 with access chamber door 306. An access chamber may include one or more doors and a door may be, for example, a rollup door.

In a greenhouse with structures such as tables at ground level dead air is created below the tables and a tunnel ventilated structure may be preferred. Under table wall tunnel air tubes may be an important element for proper air flow, above, below and through the plants. They serve different air flow patterns in winter verses summer.

In winter heated air delivered from above to the plant grow areas via wall tube fans naturally rises up and away from the plant canopy. This natural air movement up would normally be compensated by increasing the volume of heated air delivered over the plants to compensate for the volume of air rising away from the plants but would also increase energy costs.

With side wall tunnels, 3 horsepower fans may be set to pull air out from under the tables. An induced vacuum at the under-table chamber creates a positive air flow down and through the plant canopy. This is a highly effective positive air flow technique to pull warm dryer air down through the plants which removes excess water vapor created by plant transpiration helping to control mildew and other issues arising from excessive moisture.

Since air is pulled from under a table or other ground structure is returned to a chamber where it is recycled through wall fans, energy is saved since this air has already been heated. It also saves water due to an increase in water vapor relative humidity of the returning air.

In summer, two 3 hp side wall tunnel fans may be rotated or reversed to push air to the under-table air region or chamber as opposed to a pulling action in winter. The side wall tunnel fans air source may be the same air source as the wall tube fans. The air may be cooled via misting to a calculated capacity to provide the ability to retain capacity to absorb vapor from the plant transpiration yet maintaining proper relative humidity (RH) for optimum plant growth. Air being pushed under the tables creates an even upward, uniform vertical air flow pushing the vapor laden air up and away from the plant canopy, a uniform high quality air envelope for optimal plant growth. As well, this positive, quality air flow results with avoiding wet air pockets in the plant canopy which typically result in mildew within the plant canopy.

Side wall tunnel air tubes can be configured as part of the structure of the building. They can also be installed as a standalone product. The fans themselves are not necessarily standard fans in a frame. The frames are designed to hinge out, spin the fans to push air in the opposite direction and then hinged back to the operating position. A reversible air flow fan may be designed using a reversible mounted motor, mounted with a fixed frame eliminating the requirement to physically reverse the fans. The fans can be installed using VFD controllers to vary the air flow as needed.

Figure 4:
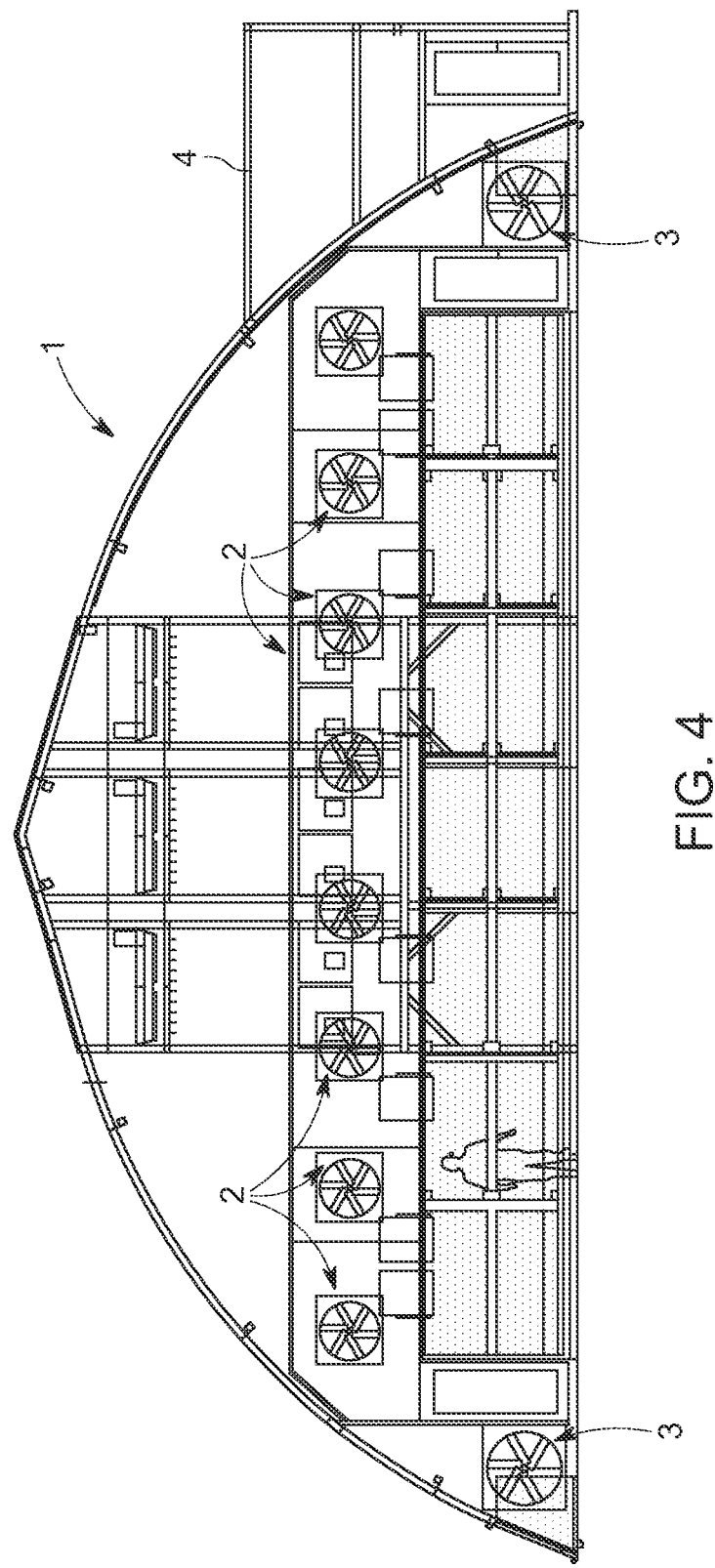
FIG. 4 shows another embodiment of a greenhouse of the disclosure.

FIG. 4 shows a positive pressure greenhouse of the disclosure. FIG. 4 shows greenhouse 1, wall tube fans 2, sidewall air tunnel including sidewall air tunnel fans 3 and entrance chamber 4.

Figure 5:
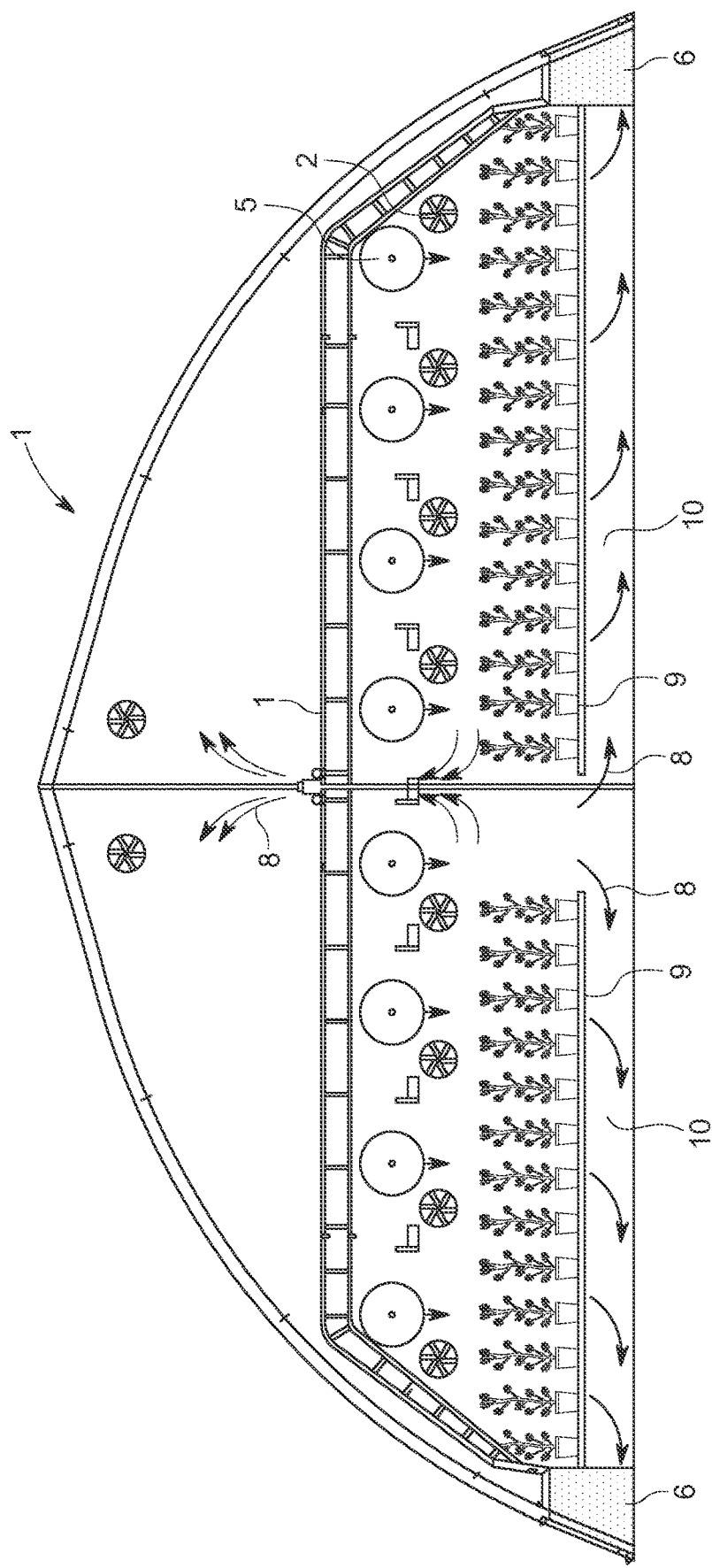
FIG. 5 shows another embodiment of a greenhouse of the disclosure.

FIG. 5 shows another embodiment of a positive pressure greenhouse of the disclosure. FIG. 5 shows greenhouse 1, wall tube fans 2 and wall tubes 5, sidewall air tunnels 6, and light deprivation curtain frame 7. Arrows 8 show direction of airflow. FIG. 5 further shows plants on tables 9 with a below table region 10 shown under tables 9. When airflow is generally in a vertical direction, regions 10 can comprise dead air or air which is not circulated.

In FIG. 4, a summer airflow direction would include sidewall air tunnel fans pushing air into the plant canopy region, i.e., into a below table region. FIG. 5 shows a winter configuration where sidewall tube fans 6 draw air from the below table region 10.

Figure 6:
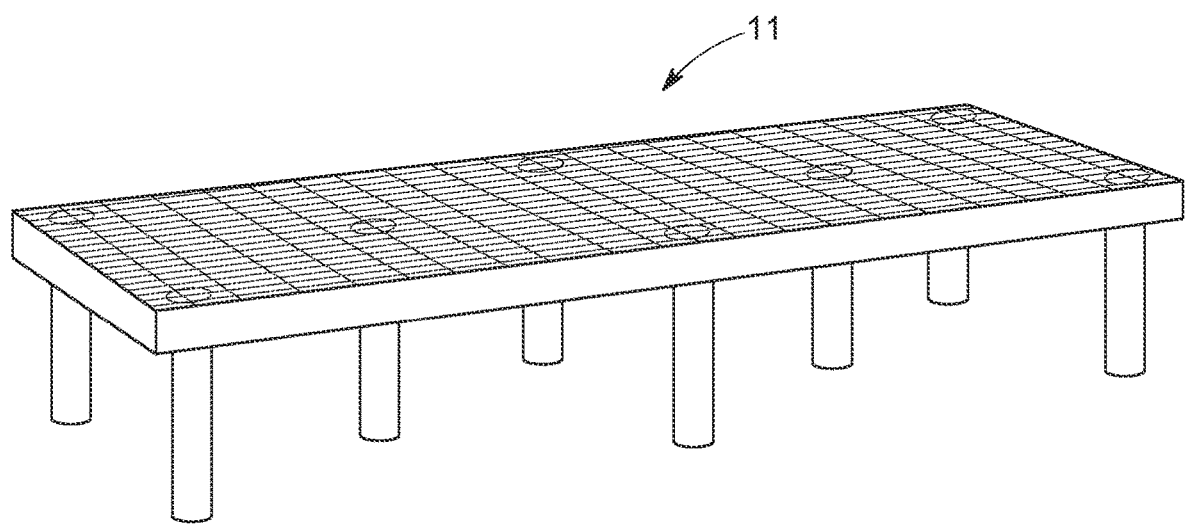
FIG. 6 shows an embodiment of a plant table of the disclosure.

FIG. 6 shows an embodiment of a plant table 11 of the disclosure.

Figure 7:
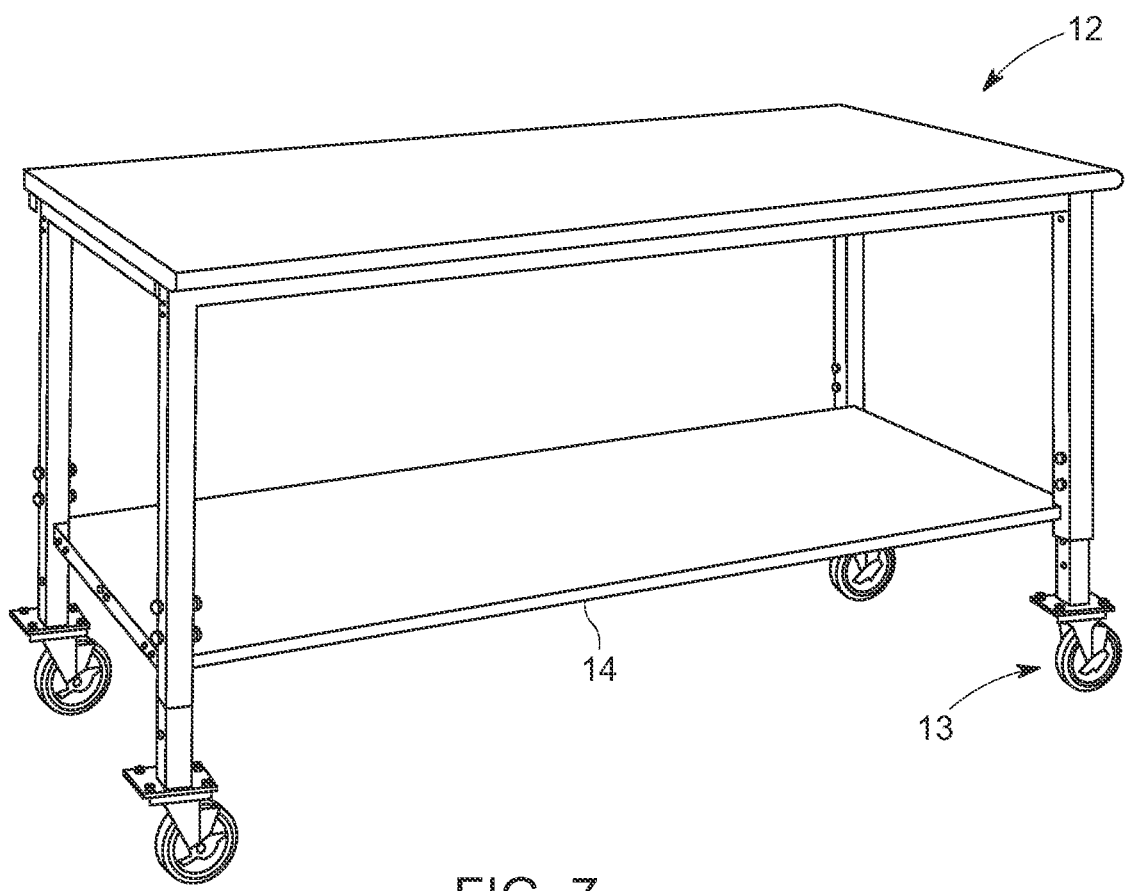
FIG. 7 shows another embodiment of a plant table of the disclosure.

FIG. 7 shows another embodiment of a plant table 12 of the disclosure. The table shown in FIG. 7 includes wheels 13 and a lower surface 14.

A plant table as described herein is generally a table used in a greenhouse to hold one or more plants. Plant tables are generally rectangular in shape and may range in length from about 2 feet to as long as 20 feet or more and may be 1 to 3 feet or up to 5 feet wide. A greenhouse plant table may have more than one surface and may include a main surface for holding one or more plants with a second surface disposed below the main table surface for holding additional items. Greenhouse plant tables are made from a variety of materials including sheet-metal, stainless steel, hard plastic materials, wood, and composite materials.

Greenhouse tubing or conduit pipe is generally tubular in shape and may be made from materials typically used in the construction of greenhouse tubing, for example, galvanized steel, hard plastic including polyethylene, or a composite material.

Fans as referred to herein generally refer to industrial type fans or blowers used in green houses. Such fans are typically circular in shape and may be in the 1-10 horsepower range although fans can be of larger or smaller size and power as needed.

Greenhouse misting systems as referred to herein are typically fogging or humidifying systems optionally used in conjunction with fans and blowers to humidify air in a greenhouse. Greenhouse misting systems can be used in conjunction with fans to blow misted air into the greenhouse. For example, a misting head can vaporize or atomize water as mist and be added to the air stream of the fan to cool or moisturize the air.

Greenhouse heaters are generally typical air heating systems that may also be optionally used in conjunction with a fan or blower or air tubes to warm air in a greenhouse. The heaters may be electric and in embodiments be placed in the green house tubing system to warm intake air before it reaches the fans.

Light deprivation systems are typically curtains or tarps that are positioned above the plants, for example, on a wood, metal, or plastic frame to block light from reaching the plants. The curtains or tarps may be blackout capable and may be made of plastic including polycarbonate or a canvas material.

In embodiments, the greenhouse of the disclosure may be specifically designed for the growing of one of the genus of *Cannabis* flowering plants. *Cannabis* is a genus of flowering plants in the family Cannabaceae. See *Cannabis*, Wikipedia, The Free Encyclopedia, Date of last revision: 8 Mar. 2021, herein incorporated by reference.

While this disclosure includes specific examples, it will be apparent after an understanding of the disclosure of this application has been attained that various changes in form and details may be made in these examples without departing from the spirit and scope of the claims and their equivalents.

The invention claimed is:

1. A positive pressure greenhouse comprising:
a ground level, a plurality of walls, and a roof;
one or more plant tables, wherein the plant table surface is disposed above ground level and comprises an area below the plant table surface and above the ground;
one or more upper wall tubes including one or more upper wall tube fans disposed between about 14 feet to about 18 feet above the ground level, wherein the upper wall tubes comprise air discharge holes along the bottom of the tubes that direct air flow towards the ground level;

one or more lower sidewall tubes comprising one or more lower side wall tube fans disposed below the plant table surface.

2. The positive pressure greenhouse of claim 1, wherein the one or more lower sidewall tube fans are configured to draw air from the area below the plant table surface, and wherein air is further drawn down from above the plant table surface to the ground level of the greenhouse.

3. The positive pressure greenhouse of claim 1, wherein the one or more lower wall tube fans are configured to blow air into the area below the plant table surface, wherein the blown air further rises above the plant table surface.

4. The positive pressure greenhouse of claim 3, wherein the blown air is subjected to misting before being blown into the area below the plant table surface.

5. The positive pressure greenhouse of claim 1, wherein the air in the upper wall tubes or the lower wall tubes is heated.

6. The positive pressure greenhouse of claim 1, further comprising a light deprivation system.

7. The positive pressure greenhouse of claim 1, further comprising an entrance chamber comprising an outer door opening to the outside, and an inner door opening to the greenhouse.

8. The positive pressure greenhouse of claim 1, wherein the lower wall tube fans are reversible.

9. The positive pressure greenhouse of claim 1, wherein the positive pressure greenhouse comprises two regions, a grow chamber region, defined by one or more of the plurality of walls, that extends from ground level to the one or more upper wall tubes, and an upper air chamber region, defined by one or more of the plurality of walls and the roof, extending from the upper wall tubes to the roof.

10. The positive pressure greenhouse of claim 9, further comprising an exhaust vent disposed in the grow room chamber region to vent air from the grow chamber region to the upper air chamber region.

11. The positive pressure greenhouse of claim 9, wherein the roof is approximately 25 feet above the ground level.

12. The positive pressure greenhouse of claim 1, wherein the air discharge holes are about 2 to about 3 inches in diameter.

\* \* \* \* \*